(12) United States Patent
Hu et al.

(10) Patent No.: US 12,316,826 B2
(45) Date of Patent: May 27, 2025

(54) OPTIMAL VIEWING ANGLE ADJUSTMENT METHOD FOR MULTI-DIMENSIONAL SPATIAL THREE-DIMENSIONAL DISPLAY SCREEN

(71) Applicant: ESDLUMEN USA LLC, Las Vegas, NV (US)

(72) Inventors: Bingkun Hu, Las Vegas, NV (US); Hujun Liu, Las Vegas, NV (US); Ren Liu, Las Vegas, NV (US)

(73) Assignee: ESDLUMEN USA LLC, Las Vegas, NV (US)

( * ) Notice: Subject to any disclaimer, the term of this patent is extended or adjusted under 35 U.S.C. 154(b) by 90 days.

(21) Appl. No.: 18/350,733

(22) Filed: Jul. 11, 2023

(65) Prior Publication Data

US 2024/0357071 A1    Oct. 24, 2024

(30) Foreign Application Priority Data

Apr. 19, 2023   (CN) .......................... 202310466684.3

(51) Int. Cl.
  *G09G 3/32* (2016.01)
  *G09G 3/00* (2006.01)
  (Continued)

(52) U.S. Cl.
  CPC ............. *H04N 13/366* (2018.05); *G09G 3/03* (2020.08); *G09G 3/32* (2013.01); *H04N 13/302* (2018.05); *H04N 13/398* (2018.05); *G09G 2320/028* (2013.01); *G09G 2354/00* (2013.01); *G09G 2358/00* (2013.01)

(58) Field of Classification Search
  CPC .. H04N 13/366; H04N 13/302; H04N 13/398; H04N 13/373; H04N 13/376; G09G 3/03; G09G 3/32; G09G 2320/028; G09G 2354/00; G09G 2358/00; Y02D 10/00; G06F 3/1446; G06F 3/011; G06F 3/147
  See application file for complete search history.

(56) References Cited

U.S. PATENT DOCUMENTS

| | | | |
|---|---|---|---|
| 9,013,560 B2 * | 4/2015 | Choi ................... | H04N 13/373 348/51 |
| 2012/0092466 A1 * | 4/2012 | Choi ................... | H04N 13/373 348/51 |

(Continued)

*Primary Examiner* — Vijay Shankar

(57) ABSTRACT

An optimal viewing angle adjustment method for a multi-dimensional spatial three-dimensional display screen, including steps of setting optimal angle parameter data between the multi-dimensional spatial three-dimensional display screen and a viewer at a front end of the multi-dimensional spatial three-dimensional display screen, disposing a detection device on the multi-dimensional spatial three-dimensional display screen for viewer identification and distance identification, identifying a distance between the viewer and the multi-dimensional spatial three-dimensional display screen by the detection device in real time, and transmitting a position and a direction of the viewer to the multi-dimensional spatial three-dimensional display screen, and controlling the multi-dimensional spatial three-dimensional display screen to zoom in or out according to the position and the direction of the viewer.

9 Claims, 4 Drawing Sheets

(51) Int. Cl.
*H04N 13/302* (2018.01)
*H04N 13/366* (2018.01)
*H04N 13/398* (2018.01)

(56) References Cited

U.S. PATENT DOCUMENTS

2023/0056305 A1* 2/2023 Karri ................ H04M 1/72454
2024/0053820 A1* 2/2024 Adcock .................. G06F 3/011

* cited by examiner

OPTIMAL VIEWING ANGLE ADJUSTMENT METHOD FOR MULTI-DIMENSIONAL SPATIAL THREE-DIMENSIONAL DISPLAY SCREEN

TECHNICAL FIELD

The present disclosure relates to a technical field of adjusting angles of multi-dimensional spatial three-dimensional display screens, and in particular to an optimal viewing angle adjustment method for a multi-dimensional spatial three-dimensional display screen.

BACKGROUND

When shooting images, conventional three-dimensional (3D) technology adopts two cameras at an angle of each other and plays images shot by the two cameras on screens, and viewers must wear polarizers to remove double image, that is, one eye of each of the viewers may only receive a group of images to form a 3D technical principle to cause a parallax error, thereby creating a three-dimensional effect. However, naked-eye 3D technology used in current main products is mainly a naked-eye 3D display device based on binocular parallax. A main principle of the naked-eye 3D display device is to arrange a grating in front of a display panel, and the grating is configured to respectively provide at least two parallax images displayed on the display panel to a left eye and a right eye of a viewer.

Current naked-eye 3D display screens are basically in an L-shaped structure, the naked-eye 3D display screens each in the L-shaped structure includes only two panels and an arc-shaped surface, a playing content of which is monotonous, and only one line or only a highlighted image quality change may be seen at some angles. In order to obtain more interactive content, a larger viewing range, and a higher image quality effect in which image quality may not become worse along with changes of angles, display terminals in the conventional 3D technology are all fixed, thereby may not change according to changes of a viewing area and a viewing angle. However, since the viewers and the viewing area may be changed, it is necessary to provide an optimal viewing angle adjustment method for a multi-dimensional spatial three-dimensional display screen.

SUMMARY

The present disclosure aims to provide an optimal viewing angle adjustment method for a multi-dimensional spatial three-dimensional display screen to solve a technical problem that current naked-eye 3D display screens are unable to perform optimal viewing angle adjustment according to a position of a viewer.

In order to achieve above aims, the present disclosure provides an optimal viewing angle adjustment method for a multi-dimensional spatial three-dimensional display screen, including following steps.

Step 1: setting optimal angle parameter data between the multi-dimensional spatial three-dimensional display screen and a viewer at a front end of the multi-dimensional spatial three-dimensional display screen.

Step 2: disposing a detection device on the multi-dimensional spatial three-dimensional display screen for viewer identification and distance identification.

Step 3: identifying a distance between the viewer and the multi-dimensional spatial three-dimensional display screen by the detection device in real time.

Step 4: transmitting a position and a direction of the viewer to the multi-dimensional spatial three-dimensional display screen, and controlling the multi-dimensional spatial three-dimensional display screen to zoom in or out according to the position and the direction of the viewer. A specific included angle degree needs to be determined according to a space size and dot spacing of an LED screen, and generally, after determining that a linear distance from the viewer to the LED screen is greater than or equal to the dot spacing of the LED screen body multiplied by two meters, an initial position point of the viewer is obtained according to the above calculation principle, and an optimal viewing position of the viewer is adjusted in real time in combination with the space size.

Furthermore, the step 4 includes following steps.

Step 4.1: sending an adaptive adjustment state request and displaying the adaptive adjustment state request on the multi-dimensional spatial three-dimensional display screen when the position of the viewer is detected to be unchanged at a fixed time.

Step 4.2: confirming the adaptive adjustment state request, by the viewer.

Step 4.3: taking a center point of the viewer as a fixed point, adjusting the multi-dimensional spatial three-dimensional display screen to swing left and ring, so that the viewer is in front of the multi-dimensional spatial three-dimensional display screen.

Step 4.4: taking the center point of the viewer as the fixed point; connecting two lines to two ends of the multi-dimensional spatial three-dimensional display screen, by the fixed point, where an included angle of the two lines is 60-120°.

Furthermore, the optimal angle parameter data in the step 1 is 60°-120° of the included angle of the two lines connecting the fixed point and the two ends of the multi-dimensional spatial three-dimensional display screen and 80°-120° of included angles between display panels of the multi-dimensional spatial three-dimensional display screen; when the position of the viewer is changed, an overall position of the multi-dimensional spatial three-dimensional display screen is changed, so that the viewer is always in front of the multi-dimensional spatial three-dimensional display screen.

Furthermore, in the step 2, disposing the multi-dimensional spatial three-dimensional display screen on an angle conversion device, controlling the multi-dimensional spatial three-dimensional display screen to rotate within a set range by the angle conversion device, thereby ensuring that the multi-dimensional spatial three-dimensional display screen follows the viewer to automatically change directions when the position of the viewer is changed. And, in a process of following the viewer by the multi-dimensional spatial three-dimensional display screen, after the position of the viewer is changed, detecting position changes of the viewer by the detection device on the multi-dimensional spatial three-dimensional display screen, and sending a rotation request when the position of the viewer is detected to be unchanged at the fixed time; selecting an agreement request or a rejection request by the viewer, and defaulting the viewer as selecting the agreement request if the viewer does not respond to the multi-dimensional spatial three-dimensional display screen; or, controlling the multi-dimensional spatial three-dimensional display screen to rotate through a remote control by the viewer.

Furthermore, the multi-dimensional spatial three-dimensional display screen includes a first plane display screen, a second plane display screen, a third plane display screen, a fourth plane display screen, an interaction identification device, a first inner arc curved screen control device, an outer arc curved screen control device, and a second inner arc curved screen control device. A first side of the first plane display screen is connected to a first side of the second plane display screen, the first plane display screen and the second plane display screen are not disposed in parallel, a second side of the second plane display screen is connected to a first side of the third plane display screen, the second plane display screen and the third plane display screen are not disposed in parallel, a second side of the third plane display screen is connected to the fourth panel display screen, and the third panel display screen and the fourth display screen are not disposed in parallel. A display panel of the first panel display screen, a display panel of the second panel display screen, a display panel of the third panel display screen, and a display panel of the fourth panel display screen are disposed in the same direction. The first panel display screen, the second panel display screen, the third panel display screen, and the fourth panel display screen form a W-shaped multi-dimensional spatial display structure, the interaction identification device is disposed at an upper end of a connection between the second panel display screen and the third panel display screen, the first inner arc curved screen control device is disposed at a rear end of a connection between the first panel display screen and the second panel display screen, the outer arc curved screen control device is disposed at a rear end of a connection between the second panel display screen and the third panel display screen, and the second inner arc curved screen control device is disposed at a rear end of a connection between the third panel display screen and the fourth panel display screen. The interaction identification device is configured to identify whether the viewer has an interaction instruction, and when the interaction instruction is identified, the interaction instruction is transmitted to the first inner arc curved screen control device, the outer arc curved screen control device, and the second inner arc curved screen control device for controlling the multi-dimensional spatial three-dimensional display screen to zoom in or out. The first inner arc curved screen control device, the outer arc curved screen control device, and the second inner arc curved screen control device are configured to simultaneously control the multi-dimensional spatial three-dimensional display screen to zoom in or out.

Furthermore, the detection device includes an image identification device and an ultrasonic array unit in the detection device, the image identification device is configured to identify the position of the viewer in an image where the viewer is presented; when a plurality of viewers appear in the image, a middle-positioned viewer in the plurality of the viewers is taken as the center point of the viewer, the ultrasonic array unit is controlled to transmit ultrasonic waves to corresponding directions to measure the distance between the viewer and the multi-dimensional spatial three-dimensional display screen, and the ultrasonic waves are controlled by phase modulation, thereby changing occurrence directions of the ultrasonic waves and further more accurately identifying the distance between the viewer and the multi-dimensional spatial three-dimensional display screen.

Furthermore, in the step 4, after detecting a position of the center point of the viewer, since the center point of the viewer is always in front of the multi-dimensional spatial three-dimensional display screen, connecting a middle position of the multi-dimensional spatial three-dimensional display screen with the center point of the viewer to obtain a connection center line, then connecting the middle position of the multi-dimensional spatial three-dimensional display screen respectively with the two ends of the multi-dimensional spatial three-dimensional display screen to form a triangle; obtaining a degree of a half of the included angle of the two lines connecting the fixed point and the two ends of the multi-dimensional spatial three-dimensional display screen by a trigonometric function of the triangle, then adjusting the included angle of the two lines connecting the fixed point and the two ends of the multi-dimensional spatial three-dimensional display screen and calculating the included angle of the two lines connecting the fixed point and the two ends of the multi-dimensional spatial three-dimensional display screen.

Furthermore, the multi-dimensional spatial three-dimensional display screen includes a first inner arc curved screen, the first inner arc curved screen is disposed at the connection between the first panel display screen and the second panel display screen. A display panel of the first inner arc curved screen is in the same direction as the display panel of the first panel display screen and the display panel of the second panel display screen. The first inner arc curved screen control device is disposed at a rear end of the first inner arc curved screen, and the first inner arc curved screen is configured as a flexible curved screen.

Furthermore, the multi-dimensional spatial three-dimensional display screen includes a second inner arc curved screen, the second inner arc curved screen is disposed at the connection between the third panel display screen and the fourth panel display screen. A display panel of the second inner arc curved screen is in the same direction as the display panel of the third panel display screen and the display panel of the fourth panel display screen. The second inner arc curved screen control device is disposed at a rear end of the second inner arc curved screen, and the second inner arc curved screen is configured as a flexible curved screen.

Furthermore, the multi-dimensional spatial three-dimensional display screen includes an outer arc curved screen, the outer arc curved screen is disposed between the second panel display screen and the third panel display screen. A display panel of the outer arc curved screen is in the same direction as the display panel of the second panel display screen and the display panel of the third panel display screen. The outer arc curved screen control device is disposed at a rear end of the outer arc curved screen, and the outer arc curved screen is configured as a flexible curved screen.

Based on above technical solutions, beneficial effects of the present disclosure are as following.

According to the present disclosure, the included angles between the display panels of the multi-dimensional spatial three-dimensional display screen are adjusted through measuring the position where the viewer is located in real time, so that the multi-dimensional spatial three-dimensional display screen may be in front of the viewer in real time, meanwhile, the angle between the viewer and the multi-dimensional spatial three-dimensional display screen is an optimal angle, so that the multi-dimensional spatial three-dimensional display screen automatically follows the viewer for adjustment, and the viewer may always enjoy the highest-quality three-dimensional images.

Figure 1:
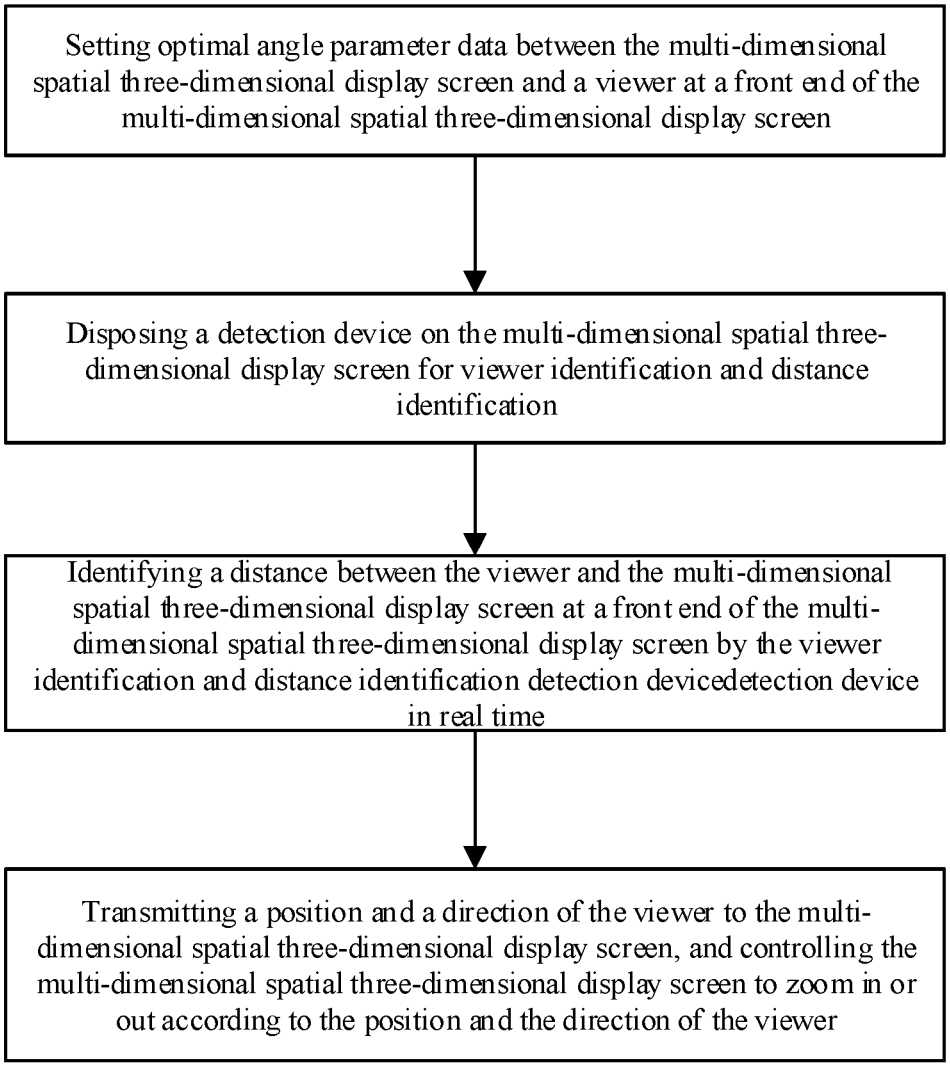
FIG. 1 is flowchart of an optimal viewing angle adjustment method for a multi-dimensional spatial three-dimensional display screen of the present disclosure.

REFERENCE NUMERALS IN THE DRAWINGS 1. first plane display screen; 2. first inner arc curved screen; 3. second plane display screen; 4. outer arc curved screen; 5. third plane display screen; 6. second inner arc curved screen; 7. fourth plane display screen; 8. inner arc curved screen led lamp panel; 9. inner arc curved screen protection layer; 10. inner arc curved screen module bottom housing; 11. inner arc curved screen housing body; 12. outer arc curved screen protection layer; 13. outer arc curved screen LED lamp; 14. outer arc curved screen circuit board; 15. outer arc curved screen housing body; 16. interaction identification device 17. first inner arc curved screen control device; 18. outer arc curved screen control device; 19. second inner arc curved screen control device; 20. viewer.

DETAILED DESCRIPTION

In order to make objectives, technical solutions, and advantages of the present disclosure clearer, the present disclosure is further described in detail below with reference to accompanying drawings. It should be noted, however, that many of the details listed in the specification are merely for a thorough understanding of the reader on one or more aspects of the present disclosure, and these aspects of the present disclosure may be implemented even without these specific details.

It should be noted that, if a directional indication is involved in the embodiments of the present disclosure, the directional indication is only used to interpret a relative positional relationship, a motion situation, etc. between the components in a certain specific attitude, and if the specific attitude changes, the directional indication also changes accordingly.

In addition, if the embodiments of the present disclosure relate to descriptions such as "first" and "second", the descriptions of "first", "second", etc. are only used for descriptive purposes, and cannot be understood as indicating or implying their relative importance or implicitly indicating the number of indicated technical features. Thus, the features defined with "first" and "second" may explicitly or implicitly include at least one of the features. In addition, the meaning of "and/or" appearing in the entire text includes three parallel solutions, and uses "A and/or B" as an example, including solution A, or solution B, or solutions A and B satisfied at the same time. In addition, the technical solutions between the various embodiments may be combined with each other, but must be based on those who skilled in the art, and when the combination of the technical solutions is contradictory or cannot be implemented, it should be considered that the combination of the technical solutions does not exist, nor is within the protection scope of the present disclosure.

Figure 2:
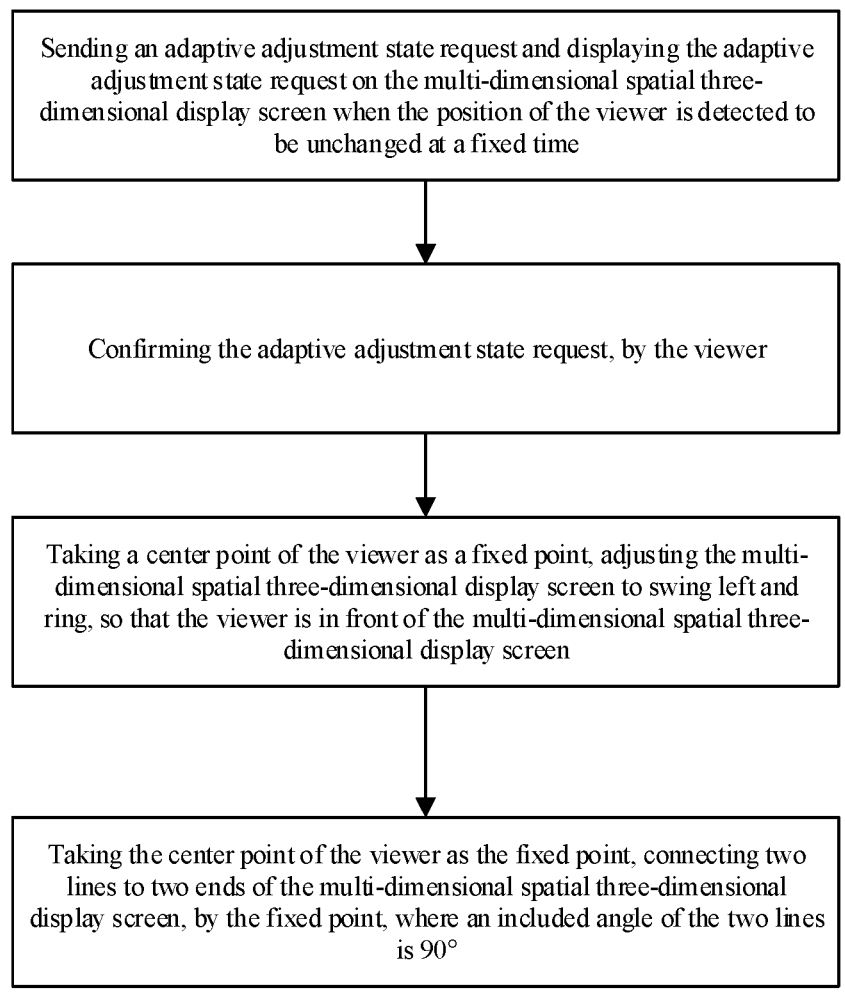
FIG. 2 is a flowchart of identifying an instruction gesture in the optimal viewing angle adjustment method for the multi-dimensional spatial three-dimensional display screen of the present disclosure.

As shown in FIGS. 1-2, the present disclosure provides an optimal viewing angle adjustment method for a multi-dimensional spatial three-dimensional display screen, including following steps.

Step 1: setting optimal angle parameter data between the multi-dimensional spatial three-dimensional display screen and a viewer at a front end of the multi-dimensional spatial three-dimensional display screen. Specifically, The optimal angle parameter data in the step 1 is 60°-120° of the included angle of the two lines connecting the fixed point and the two ends of the multi-dimensional spatial three-dimensional display screen and 80°-120° of included angles between display panels of the multi-dimensional spatial three-dimensional display screen; when the position of the viewer is changed, an overall position of the multi-dimensional spatial three-dimensional display screen is changed, so that the viewer is always in front of the multi-dimensional spatial three-dimensional display screen. The optimal angle parameter data serves as reference data to provide support for later adjustment.

Step 2: disposing a detection device on the multi-dimensional spatial three-dimensional display screen for viewer identification and distance identification. Specifically, in the step 2, disposing the multi-dimensional spatial three-dimensional display screen on an angle conversion device, controlling the multi-dimensional spatial three-dimensional display screen to rotate within a set range by the angle conversion device, thereby ensuring that the multi-dimensional spatial three-dimensional display screen follows the viewer to automatically change directions when the position of the viewer is changed. And, in a process of following the viewer by the multi-dimensional spatial three-dimensional display screen, after the position of the viewer is changed, detecting position changes of the viewer by the detection device on the multi-dimensional spatial three-dimensional display screen, and sending a rotation request when the position of the viewer is detected to be unchanged at the fixed time; selecting an agreement request or a rejection request by the viewer, and defaulting the viewer as selecting the agreement request if the viewer does not respond to the multi-dimensional spatial three-dimensional display screen; or, controlling the multi-dimensional spatial three-dimensional display screen to rotate through a remote control by the viewer.

Step 3: identifying a distance between the viewer and the multi-dimensional spatial three-dimensional display screen by the detection device in real time.

Step 4: transmitting a position and a direction of the viewer to the multi-dimensional spatial three-dimensional display screen, and controlling the multi-dimensional spatial three-dimensional display screen to zoom in or out according to the position and the direction of the viewer. A specific included angle degree needs to be determined according to a space size and dot spacing of an LED screen, and generally, after determining that a linear distance from the viewer to the LED screen is greater than or equal to the dot spacing of the LED screen body multiplied by two meters, an initial position point of the viewer is obtained according to the above calculation principle, and an optimal viewing position of the viewer is adjusted in real time in combination with the space size.

Step 4.1: sending an adaptive adjustment state request and displaying the adaptive adjustment state request on the multi-dimensional spatial three-dimensional display screen when the position of the viewer is detected to be unchanged at a fixed time. For example, when the viewer is detected to move from one position to another position and stay for 2-5 minutes, the viewer is determined to stay the position where the viewer stays for 2-5 minutes, then the adaptive adjustment state request is sent.

Step 4.2: confirming the adaptive adjustment state request, by the viewer. After the adaptive adjustment state request is sent, if the adaptive adjustment state request is confirmed by the viewer, the multi-dimensional spatial three-dimensional display screen enters a state of automatic identification and adjustment. First, the overall multi-dimensional spatial three-dimensional display screen is adjusted, so that the viewer 30 may be in front of the multi-dimensional spatial three-dimensional display screen in real time. After the distance between the viewer and the multi-dimensional spatial three-dimensional display screen is changed, the included angle of the two lines connecting the fixed point and the two ends of the multi-dimensional spatial three-dimensional display screen and the included angles between display panels of the multi-dimensional spatial three-dimensional display screen are adjusted to obtain an optimal viewing angle for the multi-dimensional spatial three-dimensional display screen.

Step 4.3: taking a center point of the viewer as a fixed point, adjusting the multi-dimensional spatial three-dimensional display screen to swing left and ring, so that the viewer is in front of the multi-dimensional spatial three-dimensional display screen.

Step 4.4: taking the center point of the viewer as the fixed point; connecting two lines to two ends of the multi-dimensional spatial three-dimensional display screen, by the fixed point, where an included angle of the two lines is 60-120°.

In the step 4, after detecting a position of the center point of the viewer, since the center point of the viewer is always in front of the multi-dimensional spatial three-dimensional display screen, connecting a middle position of the multi-dimensional spatial three-dimensional display screen with the center point of the viewer to obtain a connection center line, then connecting the middle position of the multi-dimensional spatial three-dimensional display screen respectively with the two ends of the multi-dimensional spatial three-dimensional display screen to form a triangle; obtaining a degree of a half of the included angle of the two lines connecting the fixed point and the two ends of the multi-dimensional spatial three-dimensional display screen by a trigonometric function of the triangle, then adjusting the included angle of the two lines connecting the fixed point and the two ends of the multi-dimensional spatial three-dimensional display screen and calculating the included angle of the two lines connecting the fixed point and the two ends of the multi-dimensional spatial three-dimensional display screen.

Figure 3:
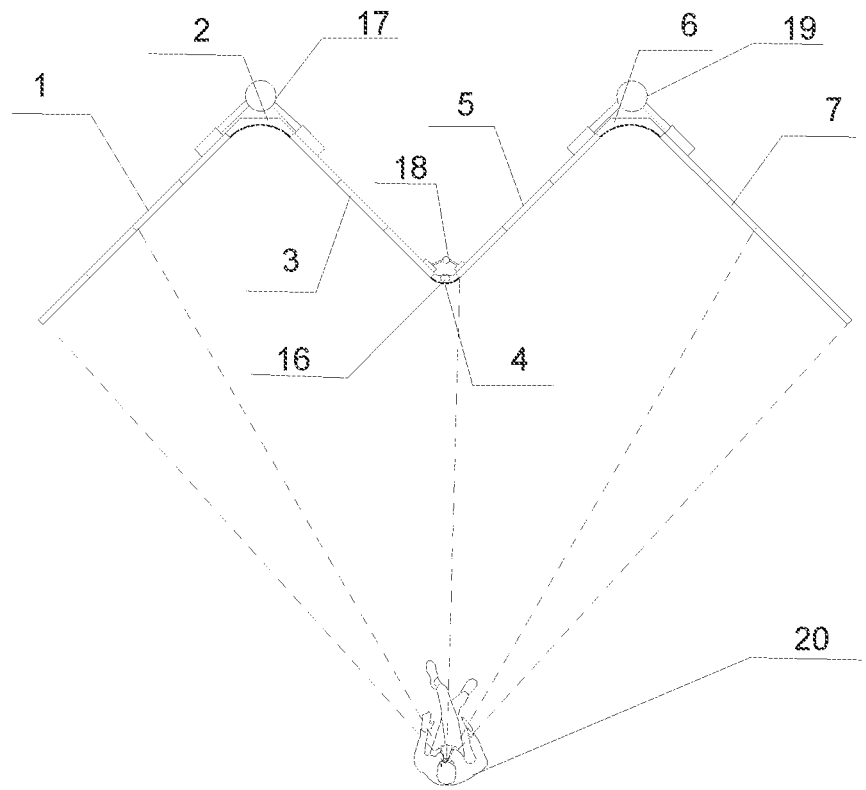
FIG. 3 is a schematic diagram of a top plan view of the multi-dimensional spatial three-dimensional display screen in the optimal viewing angle adjustment method for the multi-dimensional spatial three-dimensional display screen of the present disclosure.

A shown in FIG. 3, the multi-dimensional spatial three-dimensional display screen includes a first plane display screen 1, a second plane display screen 3, a third plane display screen 5, a fourth plane display screen 7, an interaction identification device 16, a first inner arc curved screen control device 17, an outer arc curved screen control device 18, and a second inner arc curved screen control device 19. A first side of the first plane display screen 1 is connected to a first side of the second plane display screen 3, the first plane display screen 1 and the second plane display screen 3 are not disposed in parallel, a second side of the second plane display screen 3 is connected to a first side of the third plane display screen 5, the second plane display screen 3 and the third plane display screen 5 are not disposed in parallel, a second side of the third plane display screen 5 is connected to the fourth panel display screen 7, and the third panel display screen 5 and the fourth display screen 7 are not disposed in parallel. A display panel of the first panel display screen 1, a display panel of the second panel display screen 3, a display panel of the third panel display screen 5, and a display panel of the fourth panel display screen 7 are disposed in the same direction. The first panel display screen 1, the second panel display screen 3, the third panel display screen 5, and the fourth panel display screen 7 form a W-shaped multi-dimensional spatial display structure, the interaction identification device 16 is disposed at an upper end of a connection between the second panel display screen 3 and the third panel display screen 5, the first inner arc curved screen control device 17 is disposed at a rear end of a connection between the first panel display screen 1 and the second panel display screen 3, the outer arc curved screen control device 18 is disposed at a rear end of a connection between the second panel display screen 3 and the third panel display screen 5, and the second inner arc curved screen control device 19 is disposed at a rear end of a connection between the third panel display screen 5 and the fourth panel display screen 7. The interaction identification device 16 is configured to identify whether the viewer has an interaction instruction, and when the interaction instruction is identified, the interaction instruction is transmitted to the first inner arc curved screen control device 17, the outer arc curved screen control device 18, and the second inner arc curved screen control device 19 for controlling the multi-dimensional spatial three-dimensional display screen to zoom in or out. The first inner arc curved screen control device 17, the outer arc curved screen control device 18, and the second inner arc curved screen control device 19 are configured to simultaneously control the multi-dimensional spatial three-dimensional display screen to zoom in or out.

The detection device includes an image identification device and an ultrasonic array unit in the detection device, the image identification device is configured to identify the position of the viewer in an image where the viewer is presented; when a plurality of viewers appear in the image, a middle-positioned viewer in the plurality of the viewers is taken as the center point of the viewer, the ultrasonic array unit is controlled to transmit ultrasonic waves to corresponding directions to measure the distance between the viewer and the multi-dimensional spatial three-dimensional display screen, and the ultrasonic waves are controlled by phase modulation, thereby changing occurrence directions of the ultrasonic waves and further more accurately identifying the distance between the viewer and the multi-dimensional spatial three-dimensional display screen.

Figure 5:
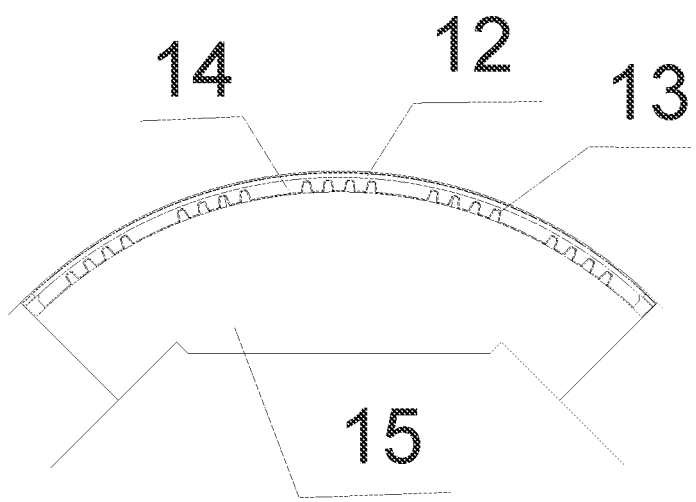
FIG. 5 is a structural schematic diagram of an outer arc curved screen in the optimal viewing angle adjustment method for the multi-dimensional spatial three-dimensional display screen of the present disclosure.

As shown in FIG. 5, the multi-dimensional spatial three-dimensional display screen includes a first inner arc curved screen 2, the first inner arc curved screen 2 is disposed at the connection between the first panel display screen 1 and the second panel display screen 3. A display panel of the first inner arc curved screen 2 is in the same direction as the display panel of the first panel display screen 1 and the display panel of the second panel display screen 3. The first inner arc curved screen control device 17 is disposed at a rear end of the first inner arc curved screen 2, and the first inner arc curved screen 2 is configured as a flexible curved screen. The multi-dimensional spatial three-dimensional display screen further includes a second inner arc curved screen 6, the second inner arc curved screen 6 is disposed at the connection between the third panel display screen 5 and the fourth panel display screen 7. A display panel of the second inner arc curved screen 6 is in the same direction as the display panel of the third panel display screen 5 and the display panel of the fourth panel display screen 7. The second inner arc curved screen control device 19 is disposed at a rear end of the second inner arc curved screen 6, and the second inner arc curved screen 6 is configured as a flexible curved screen. By providing an arrangement distance of LED lamp beads on an inner arc curved screen LED lamp panel 8, a situation that brightness in a middle of the inner arc curved screen LED lamp panel 8 is too bright is avoided, and uniform dispersion of lights is achieved.

A length of the first plane display screen 1 is the same as a length of the fourth plane display screen 7, and a length of the second plane display screen 3 is the same as the length of the third plane display screen 5. The first plane display screen 1 and the fourth plane display screen 7 are respectively disposed on two sides of the W-shaped multi-dimensional spatial display structure, and then the second plane display screen 3 and the third plane display screen 5 are disposed on a middle of the W-shaped multi-dimensional spatial display structure. An optimal viewing position is located right ahead of the connection between the second plane display screen 3 and the third plane display screen 5, a ratio of a length of an extension plane of the W-shaped multi-dimensional spatial display structure and a height of the W-shaped multi-dimensional spatial display structure is 16:9, which achieves the best effect of the multi-dimensional spatial three-dimensional display screen. The included angle between two lines connecting a center of a viewing area and two ends of the W-shaped multi-dimensional spatial display structure is 60-90°, and a viewing effect of this position is best, so that the multi-dimensional spatial three-dimensional display screen is mounted according to this position of the viewing area.

Figure 4:
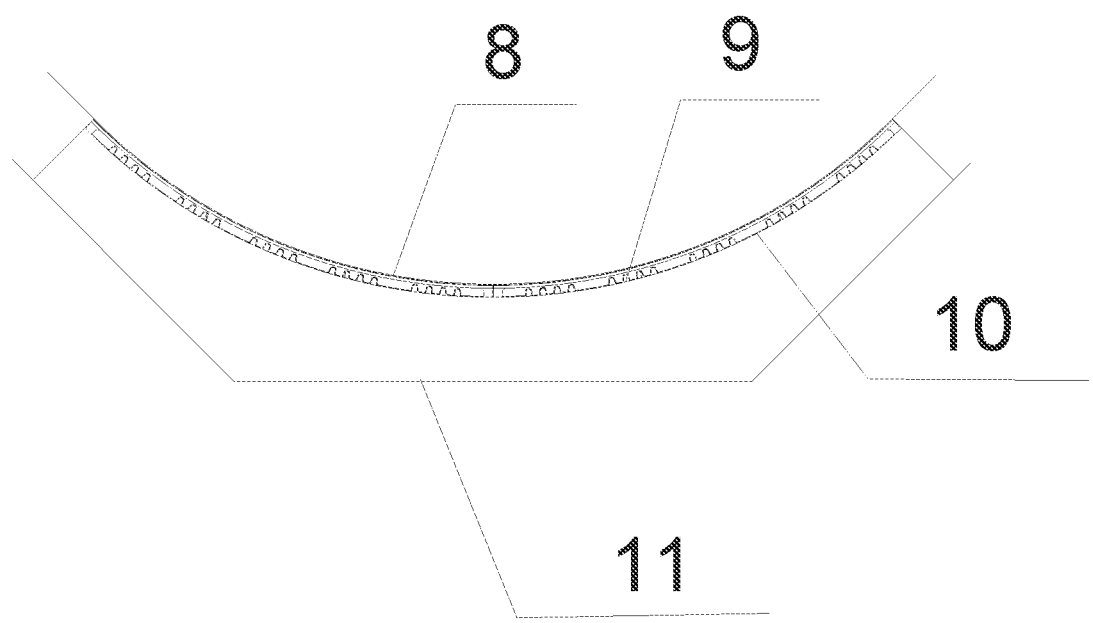
FIG. 4 is a structural schematic diagram of an inner arc curved screen in the optimal viewing angle adjustment method for the multi-dimensional spatial three-dimensional display screen of the present disclosure.

As shown in FIG. 4, the multi-dimensional spatial three-dimensional display screen includes an outer arc curved screen 4, the outer arc curved screen 4 is disposed between the second panel display screen 3 and the third panel display screen 5. A display panel of the outer arc curved screen 4 is in the same direction as the display panel of the second panel display screen 3 and the display panel of the third panel display screen 5. The outer arc curved screen control device 18 is disposed at a rear end of the outer arc curved screen 4, and the outer arc curved screen 4 is configured as a flexible curved screen. An LED lamp bead arrangement on the outer arc curved screen LED lamp panel 12 is changed according to a structure of curved surfaces, so that brightness of the outer arc curved screen LED lamp panel 12 is uniform from a distant, and a situation of appearing bright and dark lines and poor video effects is avoided.

An included angle between the first plane display screen 1 and the second plane display screen 3 is 90°, an included angle between the second plane display screen 3 and the third plane display screen 5 is 90°, and the included angle between the third plane display screen 5 and the fourth plane display screen 7 is 90°. The included angles between adjacent two of the display screens may also be finely adjusted at about 90° according to requirements.

The above is only a preferred embodiment of the present disclosure, and it should be noted that, for those who skilled in the art, several improvements and modifications may be made without departing from a principle of the present disclosure, and these improvements and modifications should also be regarded as a protection scope of the present disclosure.

What is claimed is:

1. An optimal viewing angle adjustment method for a multi-dimensional spatial three-dimensional display screen, comprising:
    step 1: setting optimal angle parameter data between the multi-dimensional spatial three-dimensional display screen and a viewer at a front end of the multi-dimensional spatial three-dimensional display screen;
    step 2: disposing a detection device on the multi-dimensional spatial three-dimensional display screen for viewer identification and distance identification;
    step 3: identifying a distance between the viewer and the multi-dimensional spatial three-dimensional display screen by the detection device in real time; and
    step 4: transmitting a position and a direction of the viewer to the multi-dimensional spatial three-dimensional display screen, and controlling the multi-dimensional spatial three-dimensional display screen to zoom in or out according to the position and the direction of the viewer;
    wherein the step 4 comprises:
    step 4.1: sending an adaptive adjustment state request and displaying the adaptive adjustment state request on the multi-dimensional spatial three-dimensional display screen when the position of the viewer is detected to be unchanged at a fixed time;
    step 4.2: confirming the adaptive adjustment state request, by the viewer;
    step 4.3: taking a center point of the viewer as a fixed point, adjusting the multi-dimensional spatial three-dimensional display screen to swing left and ring, so that the viewer is in front of the multi-dimensional spatial three-dimensional display screen; and
    step 4.4: taking the center point of the viewer as the fixed point; connecting two lines to two ends of the multi-dimensional spatial three-dimensional display screen, by the fixed point, where an included angle of the two lines is 60-120°.

2. The optimal viewing angle adjustment method for the multi-dimensional spatial three-dimensional display screen according to claim 1, wherein the optimal angle parameter data in the step 1 is 60°-120° of the included angle of the two lines connecting the fixed point and the two ends of the multi-dimensional spatial three-dimensional display screen and 80°-120° of included angles between display panels of the multi-dimensional spatial three-dimensional display screen; when the position of the viewer is changed, an overall position of the multi-dimensional spatial three-dimensional display screen is changed, so that the viewer is always in front of the multi-dimensional spatial three-dimensional display screen.

3. The optimal viewing angle adjustment method for the multi-dimensional spatial three-dimensional display screen according to claim 2, wherein in the step 2, disposing the multi-dimensional spatial three-dimensional display screen on an angle conversion device, controlling the multi-dimensional spatial three-dimensional display screen to rotate within a set range by the angle conversion device, thereby ensuring that the multi-dimensional spatial three-dimensional display screen follows the viewer to automatically change directions when the position of the viewer is changed; and in a process of following the viewer by the multi-dimensional spatial three-dimensional display screen, after the position of the viewer is changed, detecting position changes of the viewer by the detection device on the multi-dimensional spatial three-dimensional display screen, and sending a rotation request when the position of the viewer is detected to be unchanged at the fixed time; selecting an agreement request or a rejection request by the viewer, and defaulting the viewer as selecting the agreement request if the viewer does not respond to the multi-dimensional spatial three-dimensional display screen; or, controlling the multi-dimensional spatial three-dimensional display screen to rotate through a remote control by the viewer.

4. The optimal viewing angle adjustment method for the multi-dimensional spatial three-dimensional display screen according to claim 3, wherein the multi-dimensional spatial three-dimensional display screen comprises a first plane display screen, a second plane display screen, a third plane display screen, a fourth plane display screen, an interaction identification device, a first inner arc curved screen control device, an outer arc curved screen control device, and a second inner arc curved screen control device; a first side of the first plane display screen is connected to a first side of the second plane display screen, the first plane display screen and the second plane display screen are not disposed in parallel, a second side of the second plane display screen is connected to a first side of the third plane display screen, the second plane display screen and the third plane display screen are not disposed in parallel, a second side of the third plane display screen is connected to the fourth panel display screen, and the third panel display screen and the fourth display screen are not disposed in parallel; a display panel of the first panel display screen, a display panel of the second panel display screen, a display panel of the third panel display screen, and a display panel of the fourth panel display screen are disposed in the same direction; the first panel display screen, the second panel display screen, the third panel display screen, and the fourth panel display screen form a W-shaped multi-dimensional spatial display structure, the interaction identification device is disposed at an upper end of a connection between the second panel display screen and the third panel display screen, the first inner arc curved screen control device is disposed at a rear end of a connection between the first panel display screen and the second panel display screen, the outer arc curved screen control device is disposed at a rear end of a connection between the second panel display screen and the third panel display screen, and the second inner arc curved screen control device is disposed at a rear end of a connection between the third panel display screen and the fourth panel display screen; the interaction identification device is configured to identify whether the viewer has an interaction instruction, and when the interaction instruction is identified, the interaction instruction is transmitted to the first inner arc curved screen control device, the outer arc curved screen control device, and the second inner arc curved screen control device for controlling the multi-dimensional spatial three-dimensional display screen to zoom in or out; the first inner arc curved screen control device, the outer arc curved screen control device, and the second inner arc curved screen control device are configured to simultaneously control the multi-dimensional spatial three-dimensional display screen to zoom in or out.

5. The optimal viewing angle adjustment method for the multi-dimensional spatial three-dimensional display screen according to claim 4, wherein the detection device comprises an image identification device and an ultrasonic array unit in the detection device, the image identification device is configured to identify the position of the viewer in an image where the viewer is presented; when a plurality of viewers appear in the image, a middle-positioned viewer in the plurality of the viewers is taken as the center point of the viewer, the ultrasonic array unit is controlled to transmit ultrasonic waves to corresponding directions to measure the distance between the viewer and the multi-dimensional spatial three-dimensional display screen, and the ultrasonic waves are controlled by phase modulation, thereby changing occurrence directions of the ultrasonic waves and furthermore accurately identifying the distance between the viewer and the multi-dimensional spatial three-dimensional display screen.

6. The optimal viewing angle adjustment method for the multi-dimensional spatial three-dimensional display screen according to claim 5, wherein in the step 4, after detecting a position of the center point of the viewer, since the center point of the viewer is always in front of the multi-dimensional spatial three-dimensional display screen, connecting a middle position of the multi-dimensional spatial three-dimensional display screen with the center point of the viewer to obtain a connection center line, then connecting the middle position of the multi-dimensional spatial three-dimensional display screen respectively with the two ends of the multi-dimensional spatial three-dimensional display screen to form a triangle; obtaining a degree of a half of the included angle of the two lines connecting the fixed point and the two ends of the multi-dimensional spatial three-dimensional display screen by a trigonometric function of the triangle, then adjusting the included angle of the two lines connecting the fixed point and the two ends of the multi-dimensional spatial three-dimensional display screen and calculating the included angle of the two lines connecting the fixed point and the two ends of the multi-dimensional spatial three-dimensional display screen.

7. The optimal viewing angle adjustment method for the multi-dimensional spatial three-dimensional display screen according to claim 6, wherein the multi-dimensional spatial three-dimensional display screen comprises a first inner arc curved screen, the first inner arc curved screen is disposed at the connection between the first panel display screen and the second panel display screen; a display panel of the first inner arc curved screen is in the same direction as the display panel of the first panel display screen and the display panel of the second panel display screen; the first inner arc curved screen control device is disposed at a rear end of the first inner arc curved screen, and the first inner arc curved screen is configured as a flexible curved screen.

8. The optimal viewing angle adjustment method for the multi-dimensional spatial three-dimensional display screen according to claim 7, wherein the multi-dimensional spatial three-dimensional display screen comprises a second inner arc curved screen, the second inner arc curved screen is disposed at the connection between the third panel display screen and the fourth panel display screen; a display panel of the second inner arc curved screen is in the same direction as the display panel of the third panel display screen and the display panel of the fourth panel display screen; the second inner arc curved screen control device is disposed at a rear end of the second inner arc curved screen, and the second inner arc curved screen is configured as a flexible curved screen.

9. The optimal viewing angle adjustment method for the multi-dimensional spatial three-dimensional display screen according to claim 8, wherein the multi-dimensional spatial three-dimensional display screen comprises an outer arc curved screen, the outer arc curved screen is disposed between the second panel display screen and the third panel display screen; a display panel of the outer arc curved screen is in the same direction as the display panel of the second panel display screen and the display panel of the third panel display screen; the outer arc curved screen control device is disposed at a rear end of the outer arc curved screen, and the outer arc curved screen is configured as a flexible curved screen.

* * * * *